United States Patent [19]
Rogers

[11] Patent Number: 4,523,255
[45] Date of Patent: Jun. 11, 1985

[54] CATHODE FOR AN ELECTROLYTIC CAPACITOR

[75] Inventor: Donald G. Rogers, Pownal, Vt.

[73] Assignee: Sprague Electric Company, North Adams, Mass.

[21] Appl. No.: 533,678

[22] Filed: Sep. 19, 1983

[51] Int. Cl.³ .............................................. H01G 9/00
[52] U.S. Cl. ................................................... 361/433
[58] Field of Search ......................................... 361/433

[56] References Cited

U.S. PATENT DOCUMENTS

| | | | |
|---|---|---|---|
| 2,908,849 | 11/1959 | Taylor | 361/433 |
| 3,205,416 | 9/1965 | Bernard et al. | 361/433 |
| 3,243,316 | 3/1966 | O'Nan et al. | 117/226 |
| 3,628,103 | 12/1971 | Booe | 317/230 |
| 3,845,364 | 11/1974 | Shoot | 317/230 |
| 4,020,401 | 4/1977 | Cannon et al. | 361/433 |
| 4,245,275 | 1/1981 | Cannon | 361/433 |

Primary Examiner—Donald A. Griffin

[57] ABSTRACT

A metal container for use as a cathode in a tantalum electrolytic capacitor is drawn from a metal composite which has a layer of tantalum bonded to a copper layer in turn bonded to a nickel layer. The tantalum layer forms the interior of the can and the nickel, the exterior. A layer of tantalum carbide is formed on the tantalum interior and is covered by a layer of finely-divided carbon.

7 Claims, 2 Drawing Figures

CATHODE FOR AN ELECTROLYTIC CAPACITOR

BACKGROUND OF THE INVENTION

This invention pertains to a cathode for a tantalum electrolytic capacitor, and more particularly to a metal composite cathode having an inner layer of tantalum, a copper middle layer and a nickel outer layer. A layer of tantalum carbide formed on the tantalum interior layer of the cathode is covered by a layer of finely-divided carbon.

The cathode for wet tantalum electrolytic capacitors should be able to withstand reverse polarity voltage. When a silver cathode is used, such reverse polarity causes dissolution of the silver with silver ions going into solution in the electrolyte. Under prolonged operating conditions, the silver tends to come out of solution in the form of needles which can bridge the space between cathode and anode to short out the capacitor.

To remedy this silver migration problem, gold, silver-gold alloy, or gold-platinum alloy layers have been applied to a less-expensive base, e.g. copper, and used in the prior art as the cathode. Alternately, expensive all-tantalum cans have been used in the prior art, but an air oxide film which readily forms on tantalum prevents good electrical contact between a tantalum cathode and the electrolyte. There has also been a problem in adhesion between tantalum and materials like platinum black. For these reasons, a tantalum carbide layer which does provide good electrical contact has been used on tantalum cans.

SUMMARY OF THE INVENTION

This invention features a cathode container for a tantalum electrolytic capacitor which is formed from a metal composite which has a layer of tantalum bonded to a copper layer in turn bonded to a nickel layer. The tantalum layer forms the inside of the cathode container, and the nickel the outside. At least a portion of the tantalum interior is covered with a layer of tantalum carbide to prevent the formation of an air oxide layer on the cathode, and the carbide is covered with a layer of finely-divided carbon to increase cathode surface area.

Copper is chosen for the intermediate layer for both economic reasons and because of its ductility. Nickel is used as the exterior layer for cosmetic reasons as copper forms an unsightly oxidation product.

The cathode container or can is preferably formed by drawing the metal composite by known techniques. Then, a layer of tantalum carbide is formed by applying a dispersion of finely-divided carbon on at least a portion of the tantalum surface, e.g., by filling the can with the dispersion, and emptying it out leaving a film of carbon on the can, and then heating to at most 1080° C. in a non-reactive atmosphere to thermally react the carbon and tantalum.

The temperature of the reaction must not exceed 1080° C. or the copper layer of the composite cathode container will melt and should be above 900° C. for the reaction to take place. A temperature of about 1040° C. is preferred, inasmuch as the reaction takes place quickly enough at that temperature to be economical without damaging the integrity of the container.

The tantalum carbide layer produced is relatively smooth, and a layer of finely-divided carbon is applied over it by filling the can with the carbon dispersion again, draining, and drying the can. The carbon adheres well to the tantalum carbide and does not rub off.

The dispersion of finely-divided carbon may be either an aqueous dispersion or an alcohol dispersion of carbon black, such as are available from Acheson Colloid Company under the trade names "Aquadag" and "Electrodag".

DESCRIPTION OF THE PREFERRED EMBODIMENTS

Figure 1:
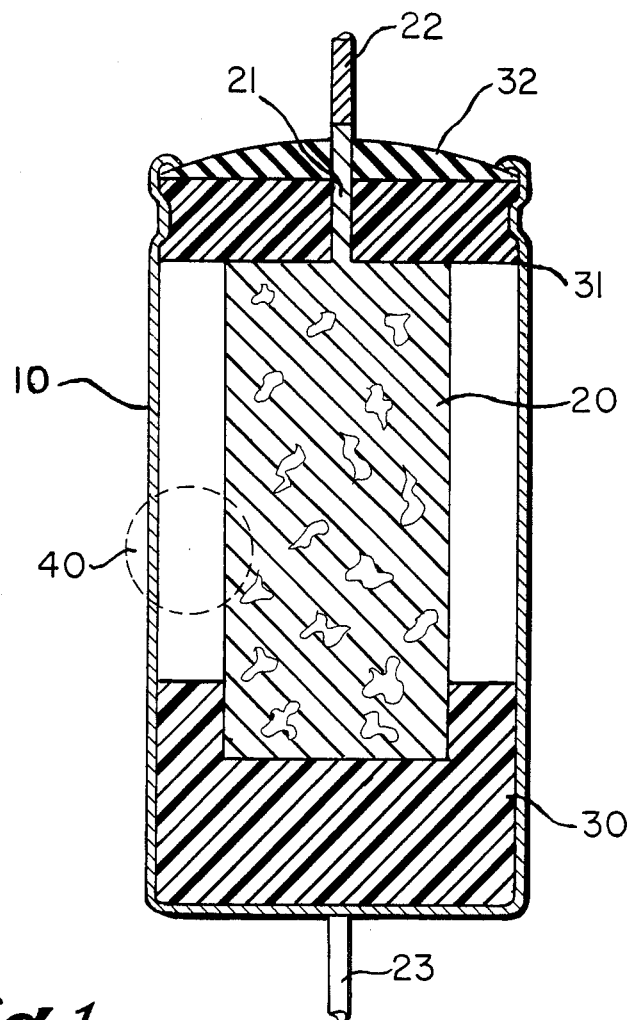
FIG. 1 is a cross-section of a capacitor utilizing the cathode of this invention.

FIG. 1 depicts a complete capacitor using the cathode of the present invention. Porous tantalum anode 20 is mounted in vibration spacer 30 in the bottom of can 10. Gasket 31 forces anode 20 against spacer 30. Anode riser 21 extends through gasket 31 and elastomeric seal 32. Anode lead 22 is attached to anode riser 21, preferably by welding, and cathode lead 23 is affixed, again preferably by welding, to the outside of can 10. Tantalum carbide layer 14 and carbon layer 15 both shown in magnified portion 40 extend up the inside of can 10 at least to the position of gasket 31. An electrolyte (not shown) fills the space between spacer 30 and gasket 31 impregnating anode 20 and providing electrical contact with cathode can 10. The electrolyte is preferably of the conventional sulfuric acid type.

Figure 2:
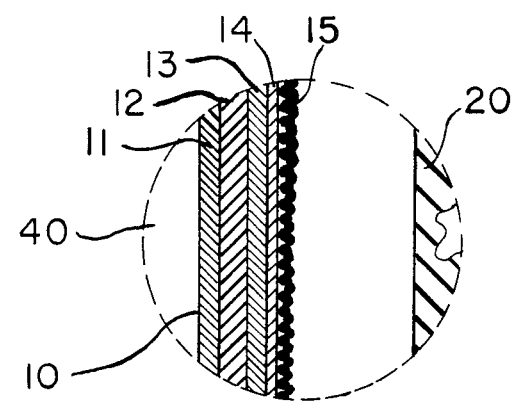
FIG. 2 is a magnified view of a portion of FIG. 1 showing the several layers of the cathode of the present invention and a portion of the anode pellet.

As shown in FIG. 2, cathode 10 of the present invention is made from a metal composite which has a layer of nickel 11 bonded to a layer of copper 12 in turn bonded to a layer of tantalum 13 which forms the interior of cathode container 10. A layer of tantalum carbide 14 is formed on the tantalum interior 13, preferably by thermally reacting finely-divided carbon and the tantalum surface. A final layer of finely-divided carbon 15 coats the tantalum carbide layer 14.

Tantalum carbide layer 14 is prepared by filling can 10 at least two-thirds full with a dispersion of finely-divided carbon, emptying, draining, and air-drying the carbon layer. Container 10 is then heated in a non-reactive atmosphere to thermally react the tantalum layer 13 and the carbon forming the tantalum carbide layer 14 firmly bonded to the tantalum. The non-reactive atmosphere may be helium, argon, or other non-reactive gas, or the heating may be conducted in a vacuum. The term non-reactive is used to preclude the use of any gas, e.g. such as nitrogen, which will react with tantalum and interfere with the formation of the carbide layer.

Container 10 is cooled and visually inspected for defects. Then, a layer of finely-divided carbon 15 is applied as above with a final oven drying to remove the solvent used in the dispersion. This solvent may be water or an organic solvent, preferably an alcohol.

The composite cathode of this invention provides good electrical properties and good electrical contact with the electrolyte without the drawbacks of silver and at much less expense than other silver substitutes, e.g., platinized layers, which are usually plated on the interior of the container. Plating can leave minute pinholes which allow the electrolyte to contact the underlying metal, which if it is silver or copper will be attacked by the electrolyte.

Since in this invention the underlying metal is copper which is attacked by hot sulfuric acid, a clad composite is used with copper forming the bulk of it. For example, in a 15 mil (0.38 mm) thick drawn cathode can, the tantalum and nickel layers are each 2.5 mil (0.05 mm) thick and the remainder, about 10 mil (0.25 mm) is copper. Such a composite is both economical and drawable. The composite is produced by known metal cladding techniques, and the can is formed from it by known metal drawing techniques.

The nickel layer forms the exterior of the can and, as noted above, is used for cosmetic purposes as copper tarnishes forming an unsightly product. The tantalum forms the interior of the can and is resistant to sulfuric acid and other electrolytes used in tantalum anode capacitors.

However, tantalum does form an air-oxide layer which reduces capacitance of the tantalum layer. To prevent its formation, the interior clean cans are coated with a dispersion of finely-divided carbon which is airdried and then fired in a non-reactive atmosphere at up to 1080° C. to convert the carbon thermally to tantalum carbide. It is preferred to fire at about 1040° C. for 30 minutes to obtain the desired reaction without harming the copper layer.

After cooling, a second layer of carbon is applied to the interior of the can, and oven-dried at 85° C. for about 30 min. This layer increases the surface area of the cathode to provide the desired cathode capacitance.

In the example below, capacitors made with the cathode of this invention are compared with capacitors made with prior art silver cathodes which they are intended to replace.

EXAMPLE 1

Two sets of 15 V capacitors were prepared. The experimental set use the metal composite cathode with the internal tantalum carbide and carbon layers. The control group used the prior art silver cathode bearing a platinized layer. Capacitance (Cap) in $\mu$F and equivalent series resistance (ESR) in milliohms were measured at 25° C., −55° C., and 85° C., and impedance (Z) in ohms was measured at −55° C. Table 1a presents the average results as well as change in capacitance (% $\Delta$C).

TABLE 1a

|  |  | Control | Experimental |
|---|---|---|---|
| Cap | 25° C. | 520. | 510. |
| " | −55° C. | 198. | 274. |
| " | 85° C. | 555. | 562. |
| % $\Delta$C | −55° C. | −62. | −46. |
| " | 85° C. | +7. | +10. |
| ESR | 25° C. | 0.67 | 0.59 |
| " | −55° C. | 22.3 | 7.59 |
| " | 85° C. | 0.4 | 0.39 |

TABLE 1a-continued

|  |  | Control | Experimental |
|---|---|---|---|
| Z | −55° C. | 23.3 | 8.99 |

The experimental group were also subjected to 0.8 V reverse voltage. As hereinbefore noted, silver cathodes are not advisable under reverse voltage conditions. Initial and final capacitance and ESR were measured as was DC leakage current in microamperes at 2, 5, and 10 minute reverse voltage.

TABLE 1b

| | | DCL (reverse) | | | | |
|---|---|---|---|---|---|---|
| $Cap_I$ | $ESR_I$ | 2 min | 5 min | 10 min | $Cap_F$ | $ESR_F$ |
| 506 | 0.521 | 17.4 | 14.9 | 14.0 | 505 | 0.558 |

As is seen from these data, capacitors made with the cathode of the present invention have excellent low temperature properties and can withstand reverse polarities.

What is claimed is:

1. In a tantalum electrolytic capacitor having a porous pellet anode and a liquid electrolyte in a metal container serving as a cathode, wherein said cathode comprises a drawn composite clad can having three metal layers bonded together, one layer being tantalum and forming the interior surface of said can, an intermediate layer of copper bonded to said tantalum, and a layer of nickel bonded to said copper layer and forming the exterior surface of said can, a layer of tantalum carbide formed on said tantalum interior surface and bonded thereto, and a layer of finely-divided carbon overlying said tantalum carbide surface.

2. A capacitor according to claim 1 wherein said carbide layer is a coating on said tantalum interior of finely-divided carbon heated in a non-reactive atmosphere to no more than 1080° C.

3. A process for preparing a cathode for a tantalum electrolytic capacitor comprising drawing a can from a metal composite having three layers, one of said layers being tantalum forming the interior of said can, one layer being nickel and forming the exterior of said can, and a third layer being copper and being intermediate said nickel layer and said tantalum layer and bonded thereto, coating said can with a dispersion of finely-divided carbon, thermally reacting said can interior and said coating at a temperature of at most 1080° C. in a non-reactive atmosphere to produce a tantalum carbide layer, and coating said carbide layer with a dispersion of finely-divided carbon.

4. A process according to claim 3 wherein said dispersion is an aqueous or an alcohol dispersion.

5. A process according to claim 3 wherein said non-reactive atmosphere is a vacuum.

6. A process according to claim 3 wherein said non-reactive atmosphere is helium or argon.

7. A process according to claim 3 wherein said temperature is about 900° to 1040° C.

* * * * *